US011782454B2

(12) United States Patent
Okano et al.

(10) Patent No.: US 11,782,454 B2
(45) Date of Patent: Oct. 10, 2023

(54) UNMANNED CONVEYING SYSTEM (71) Applicant: TOYOTA JIDOSHA KABUSHIKI KAISHA, Aichi-ken (JP)

(72) Inventors: Takahiro Okano, Chiryu (JP); Takaaki Yanagihashi, Toyota (JP); Hiroaki Kiyokami, Nisshin (JP); Toru Takashima, Susono (JP); Kenta Miyahara, Okazaki (JP); Yohei Tanigawa, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 49 days.

(21) Appl. No.: 17/472,692

(22) Filed: Sep. 13, 2021

(65) Prior Publication Data

US 2022/0121220 A1    Apr. 21, 2022

(30) Foreign Application Priority Data

Oct. 19, 2020    (JP) .................................. 2020-175557

(51) Int. Cl.
*G05D 1/02* (2020.01)
*B62D 63/04* (2006.01)
*B62D 63/02* (2006.01)
*G06Q 10/06* (2023.01)
*G06Q 10/0631* (2023.01)

(52) U.S. Cl.
CPC ........... *G05D 1/0289* (2013.01); *B62D 63/02* (2013.01); *B62D 63/04* (2013.01); *G05D 1/0212* (2013.01); *G05D 1/0287* (2013.01); *G06Q 10/06313* (2013.01); *G06Q 10/06316* (2013.01); *G05D 2201/0213* (2013.01); *G05D 2201/0216* (2013.01)

(58) Field of Classification Search
CPC ............... G05D 1/0289; G05D 1/0212; G05D 2201/0213; G05D 2201/0216; G05D 1/0287; B62D 63/02; B62D 63/04; G06Q 10/06313; G06Q 10/06316
See application file for complete search history.

(56) References Cited

U.S. PATENT DOCUMENTS

| | | | |
|---|---|---|---|
| 9,014,902 B1 * | 4/2015 | Murphy | G05D 1/0297 701/26 |
| 2017/0192438 A1 | 7/2017 | Morimoto et al. | |
| 2019/0258270 A1 | 8/2019 | Yamamuro et al. | |
| 2021/0232148 A1 * | 7/2021 | Sui | G05D 1/0297 |
| 2022/0074749 A1 * | 3/2022 | Bennett | G06Q 30/018 |

FOREIGN PATENT DOCUMENTS

| | | |
|---|---|---|
| JP | H11-259131 A | 9/1999 |
| JP | 2001318718 A | 11/2001 |
| JP | 2002362748 A | 12/2002 |
| JP | 2017-122990 A | 7/2017 |
| JP | 2019144668 A | 8/2019 |

* cited by examiner

*Primary Examiner* — Rodney A Butler
(74) *Attorney, Agent, or Firm* — HAUPTMAN HAM, LLP

(57) ABSTRACT

An unmanned conveying system includes: plural unmanned conveying vehicles that can convey cargo; a cargo priority order deciding section that decides upon a priority order in which the cargo are to be conveyed, in accordance with conditions of the cargo; and a traveling route setting section that decides upon traveling routes of the unmanned conveying vehicles on the basis of the priority order.

2 Claims, 7 Drawing Sheets

UNMANNED CONVEYING SYSTEM

CROSS-REFERENCE TO RELATED APPLICATION

This application claims priority under 35 USC 119 from Japanese Patent Application No. 2020-175557, filed on Oct. 19, 2020, the disclosure of which is incorporated by reference herein.

BACKGROUND

Technical Field

The present disclosure relates to an unmanned conveying system.

Related Art

Japanese Patent Application Laid-Open (JP-A) No. 2001-318718 discloses an inventive technique relating to a trackless, automated conveying vehicle that conveys parts (cargo) of products. This trackless, automated conveying vehicle has a detector, and the detector can measure the distance from a correction plate that is disposed along a predetermined traveling route within a factory. On the basis of the distance from the correction plate to the trackless, automated conveying vehicle, the trackless, automated conveying vehicle can correct the offset between the advancing direction and the traveling route of the trackless, automated conveying vehicle.

From the standpoint of managing manufacturing processes and the like, it is preferable to be able to decide upon the order in which cargo are conveyed, in accordance with the priority order of the cargo.

However, the above-described technique does not mention the priority order of cargo. Therefore, the above-described technique cannot manage the priority order of cargo that are conveyed by automated conveying vehicles.

SUMMARY

The present disclosure provides an unmanned conveying system that may carry out conveying of cargo in accordance with the priority order of the cargo.

A first aspect of the present disclosure is an unmanned conveying system including: plural unmanned conveying vehicles that convey cargo; a cargo priority order deciding section that decides upon a priority order in which the cargo are to be conveyed, in accordance with conditions of the cargo; and a traveling route setting section that decides upon traveling routes of the unmanned conveying vehicles on the basis of the priority order.

In accordance with the first aspect of the present disclosure, the unmanned conveying system includes plural unmanned conveying vehicles, and cargo are conveyed by these unmanned conveying vehicles.

From the standpoint of managing the manufacturing processes in a factory and the like, it is preferable to be able to decide upon the order in which the cargo, which are parts and the like, are to be conveyed in accordance with the priority order of the cargo.

Here, the first aspect has the cargo priority order deciding section and the traveling route setting section. The priority order in which the cargo are to be conveyed is decided upon at the cargo priority order deciding section in accordance with conditions of the cargo. Further, the traveling routes of the unmanned conveying vehicles are set at the traveling route setting section on the basis of the priority order of the cargo. Therefore, for example, the first aspect of the present disclosure may move an unmanned conveying vehicle, which conveys cargo whose priority order is relatively low, from the traveling route of an unmanned conveying vehicle that conveys cargo whose priority order is relatively high.

A second aspect of the present disclosure, in the above-described first aspect, may further include: a driving control section that controls traveling of the unmanned conveying vehicles; and a conveying vehicle position estimating section that estimates positions of the unmanned conveying vehicles, wherein, when the conveying vehicle position estimating section detects that the unmanned conveying vehicles that are conveying the cargo are approaching one another, and the traveling route setting section and the driving control section, on the basis of the priority order, may control traveling of a second unmanned conveying vehicle that conveys second cargo whose priority order is lower, so as to not impede traveling of a first unmanned conveying vehicle that conveys first cargo whose priority order is higher.

In accordance with the second aspect of the present disclosure, the traveling of the unmanned conveying vehicles is controlled by the driving control section, and the positions of the unmanned conveying vehicles are estimated by the conveying vehicle position estimating section. Further, when the conveying vehicle position estimating section detects that unmanned conveying vehicles that are in the midst of conveying cargo are approaching one another, the traveling route setting section and the driving control section control the traveling of the unmanned conveying vehicles on the basis of the priority order that was decided upon at the cargo priority order deciding section. Concretely, in the present disclosure, a second unmanned conveying vehicle, which conveys second cargo whose priority order is lower, may travel so as to not impede the traveling of a first unmanned conveying vehicle that conveys first cargo whose priority order is higher.

In a third aspect of the present disclosure, in the above-described second aspect, a takt time of a product, which is manufactured in a predetermined step by using a part that serves as the cargo, may be included in the conditions, and the cargo priority order deciding section may compare the takt times of the products in which the parts are to be used, at the unmanned conveying vehicles that are approaching one another, and may set the part, which is to be used in the product whose takt time is shorter, to have a higher priority order.

In accordance with the third aspect of the present disclosure, the takt time of a product, which is manufactured in a predetermined step by using a part that serves as the cargo, is included in the conditions of the cargo that determine the priority order in which the cargo are conveyed. The cargo priority order deciding section compares the takt times of the products in which the parts are to be used, at the unmanned conveying vehicles that are approaching one another, and sets the part, which is to be used in the product whose takt time is shorter, to have a higher priority order. Therefore, in the present disclosure, among unmanned conveying vehicles that are approaching one another, the traveling of the unmanned conveying vehicle that conveys a part that is to be used in a product whose takt time is short may be prioritized.

In a fourth aspect of the present disclosure, in the above-described second aspect, a size of the part may be included in the conditions, and the cargo priority order deciding section may compare evaluation indices of the parts, which are computed by multiplying the sizes of, and inverses of the takt times of, the products in which the parts are to be used, at the unmanned conveying vehicles that are approaching one another, and may set the part, whose evaluation index is higher, to have a higher priority order.

In accordance with the fourth aspect of the present disclosure, the size of a part that serves as cargo is included in the conditions of the cargo that determine the priority order in which the cargo are conveyed. The cargo priority order deciding section compares the evaluation indices of the parts, which are computed by multiplying the sizes of these parts and the inverses of the takt times of the products in which these parts are to be used, at the unmanned conveying vehicles that are approaching one another, and sets the part, whose evaluation index is higher, to have a higher priority order. Therefore, in the present disclosure, among unmanned conveying vehicles that are approaching one another, the traveling of the unmanned conveying vehicle that conveys the part whose evaluation index is higher may be prioritized.

As described above, the unmanned conveying vehicle system of the first aspect of the present disclosure may carry out the conveying of cargo in accordance with the priority order of the cargo.

The unmanned conveying system of the second aspect of the present disclosure may smoothly convey cargo whose priority order is high.

The unmanned conveying system of the third aspect of the present disclosure may prioritarily convey a part that is to be used in a product whose takt time is short.

The unmanned conveying system of the fourth aspect of the present disclosure may prioritarily convey a part that is large and whose takt time is short.

BRIEF DESCRIPTION OF THE DRAWINGS

Exemplary embodiments will be described in detail based on the following figures, wherein.

DETAILED DESCRIPTION

Figure 1:
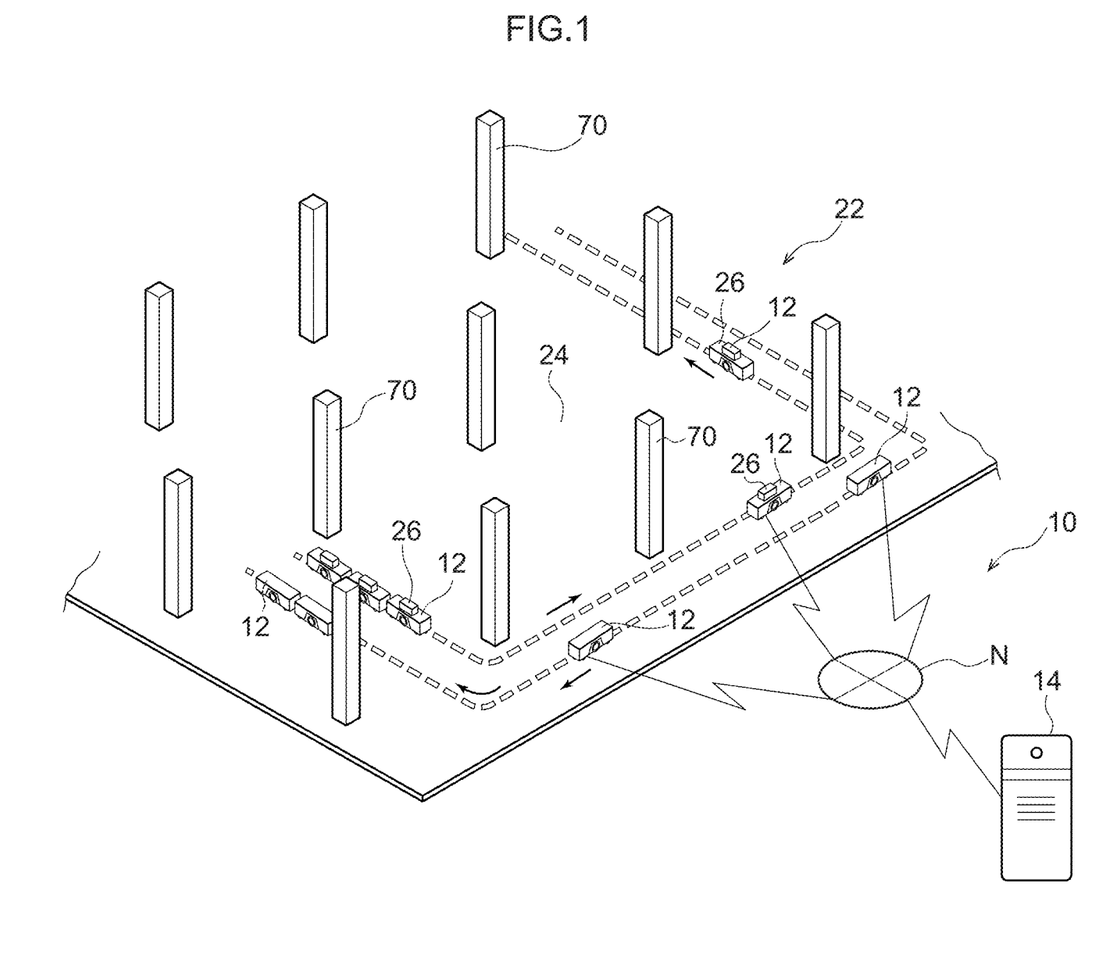
FIG. 1 is a perspective view that schematically illustrates a situation of conveying cargo by an unmanned conveying system relating to a present exemplary embodiment.

An example of an exemplary embodiment of a "unmanned conveying system 10" relating to the present disclosure is described hereinafter by using FIG. 1 through FIG. 6. As illustrated in FIG. 1, the unmanned conveying system 10 is structured to include plural "unmanned conveying vehicles 12" and a server 14.

Figure 5:
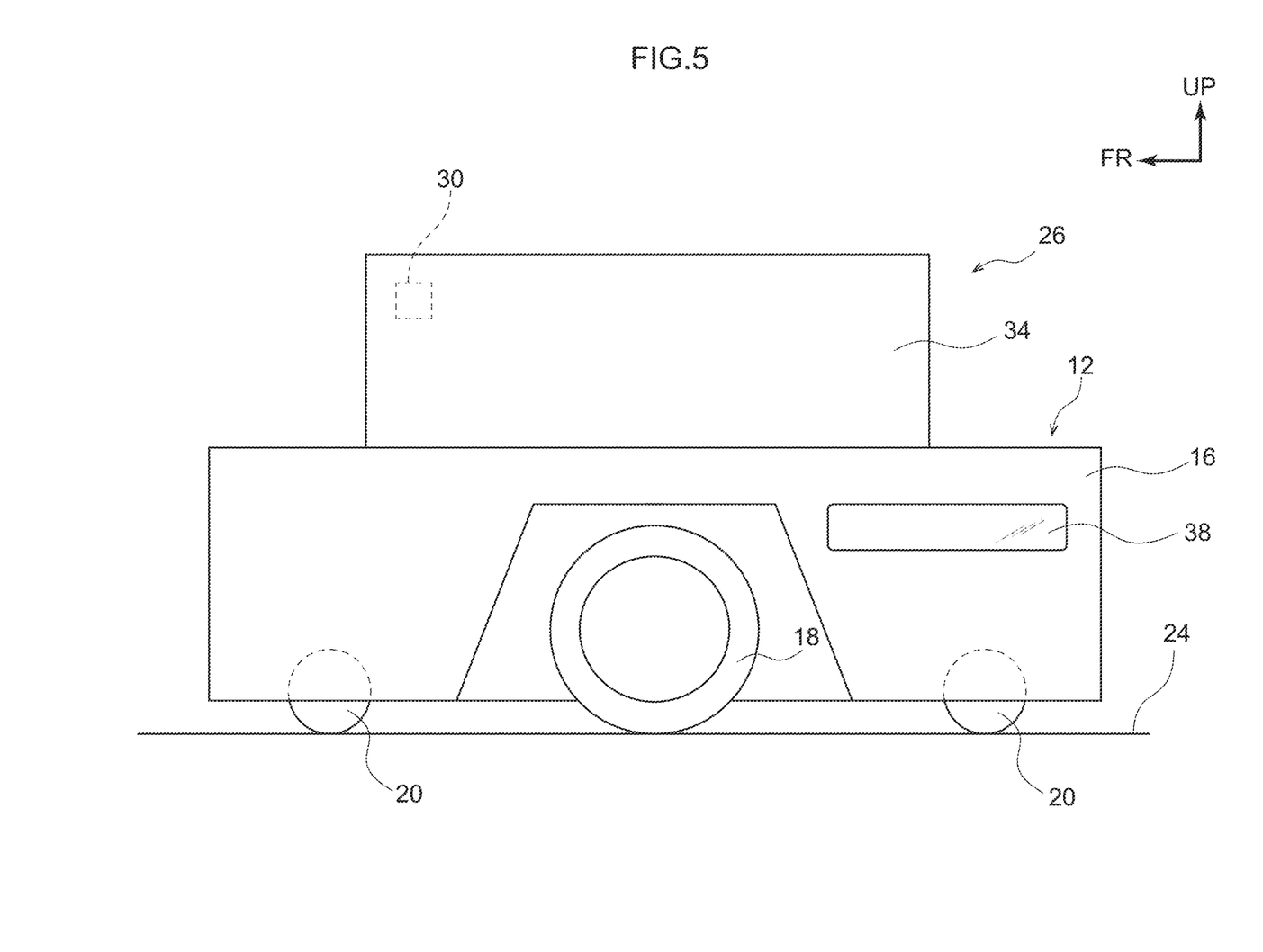
FIG. 5 is a side view that schematically illustrates the structure of the unmanned conveying vehicle that structures a portion of the unmanned conveying system relating to the present exemplary embodiment.

As illustrated in FIG. 5 as well, the unmanned conveying vehicle 12 has a vehicle body portion 16, a pair of driving wheels 18 and a pair of casters 20, and travels on a road surface 24 within a factory 22, and can convey "cargo 26". Note that arrow FR that is illustrated in FIG. 5 indicates the front side in the longitudinal direction of the unmanned conveying vehicle 12, and arrow UP indicates the upper side in the vertical direction of the unmanned conveying vehicle 12. Note that, in the following description, longitudinal direction means the longitudinal direction of the unmanned conveying vehicle 12, vertical direction means the vertical direction of the unmanned conveying vehicle 12, and transverse direction means the transverse direction of the unmanned conveying vehicle 12, unless otherwise indicated.

Figure 2:
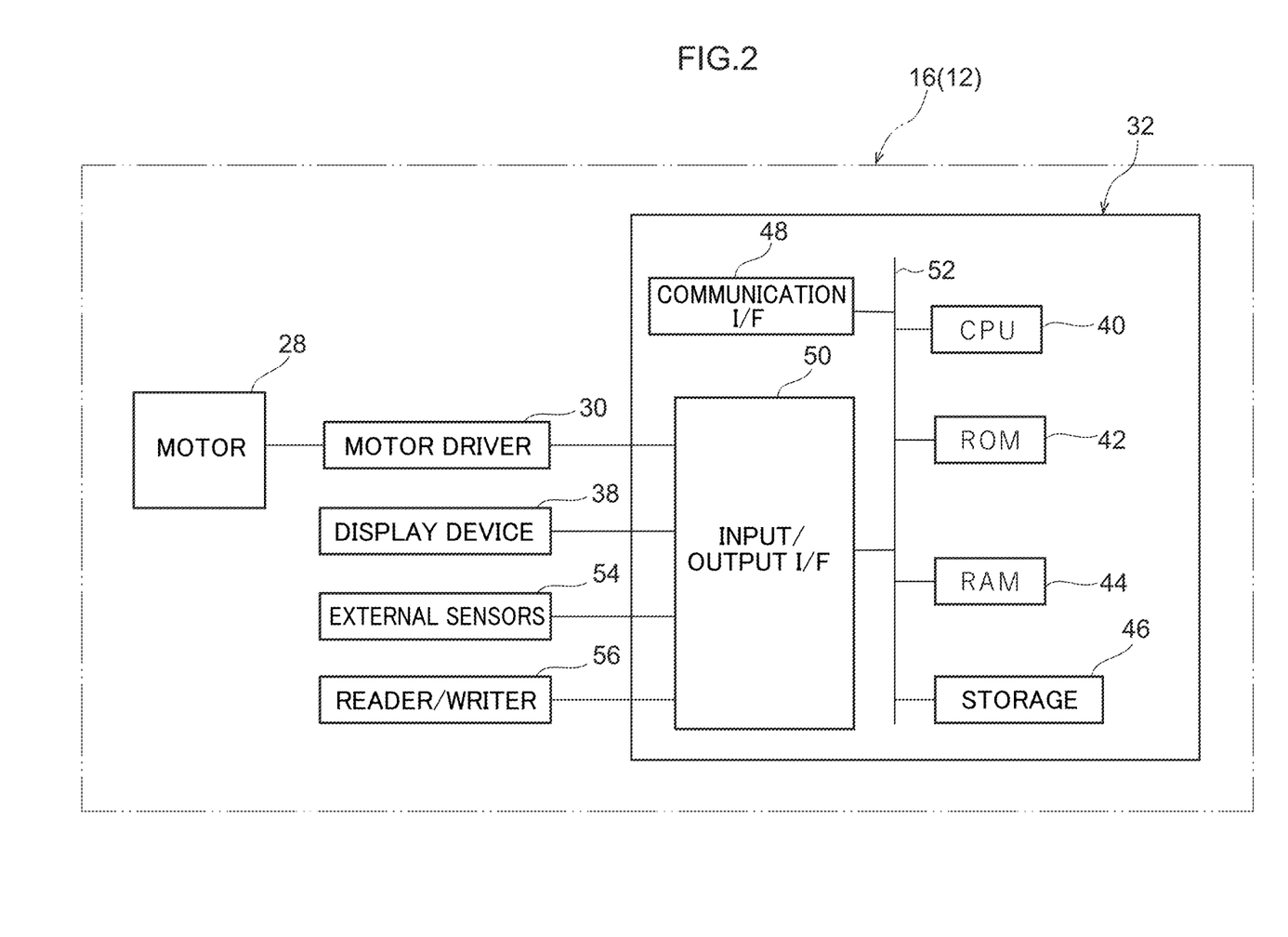
FIG. 2 is a block drawing that illustrates hardware structures of an unmanned conveying vehicle that structures a portion of the unmanned conveying system relating to the present exemplary embodiment.

The vehicle body portion 16 is formed in a rectangular parallelepiped shape whose length direction is the longitudinal direction. The cargo 26 can be placed on the upper surface of the vehicle body portion 16. The driving wheels 18 are provided at the transverse direction both sides of the longitudinal direction central portion of the vehicle body portion 16. Further, as illustrated in FIG. 2, motors 28, which impart driving force to the driving wheels 18, are connected via unillustrated power shafts to the driving wheels 18 respectively. On the other hand, the respective casters 20 are provided at the transverse direction central portions of the longitudinal direction both side portions of the vehicle body portion 16.

Moreover, a pair of a motor drivers 30 and a control device 32 are installed in the vehicle body portion 16. The motor drivers 30 are electrically connected to the corresponding motors 28 and the control device 32. The rotational speeds of the motors 28 and the like can be controlled on the basis of signals inputted from the control device 32.

On the other hand, as illustrated in FIG. 5, unillustrated parts that are used within the factory 22, and a case 34 in which these parts are accommodated, are included in the cargo 26. Basically, only one type of part is included in the cargo 26. Further, an RF (Radio Frequency) tag 36 is provided at the case 34. Various types of information relating to the parts that are accommodated in the case 34 are stored on this RF tag 36.

In further detail, the part numbers of the parts, input codes that indicate the places where the parts are to be input within the factory 22, takt times T of the products that are manufactured in predetermined processes by using the parts, and sizes V of the parts are examples of the information relating to the parts that are stored in the RF tag 36. Note that what is called the size V of the part here means the mathematical product (in cubic centimeters) of the dimensions in the three directions that are orthogonal to one another of the part.

Further, a display device 38 that is structured to include a liquid crystal panel is provided at a side surface of the vehicle body portion 16. As will be described later, various types of information relating to the parts that are included in the cargo 26 is displayed on the display device 38.

Here, the present exemplary embodiment has a feature in the point that, due to the control device 32 and the server 14 communicating, navigation of the unmanned conveying vehicles 12 is managed on the basis of the priority order of the cargo 26. Explanation continues hereinafter while focusing on the structures of the control device 32 and the server 14.

As illustrated in FIG. 2, the control device 32 is structured to include a CPU (Central Processing Unit) 40 that is an example of a processor, a ROM (Read Only Memory) 42, a RAM (Random Access Memory) 44, a storage 46, a communication I/F (InterFace) 48, and an input/output I/F 50. Further, the CPU 40, the ROM 42, the RAM 44, the storage 46, the communication I/F 48 and the input/output I/F 50 are connected so as to be able to communicate with one another via a bus 52.

The CPU 40 is a central computing processing unit, and can execute various types of programs relating to various types of control of the unmanned conveying vehicle 12. Concretely, the CPU 40 reads-out a program from the ROM 42, and can execute the program by using the RAM 44 as a workspace. Further, the control device 32 can exhibit various functions as will be described hereinafter, due to an execution program that is stored in the ROM 42 being read-out and executed by the CPU 40.

The storage 46 is structured to include an HDD (Hard Disk Drive) or an SSD (Solid State Drive), and stores various programs, including the operating system, and various data. Further, the storage 46 can store various types of information and the like that are needed for navigation of the unmanned conveying vehicle 12 as will be described later.

The communication I/F 48 is an interface that is used in connecting the control device 32 and a network N, and the communication I/F 48 enables communication with the server 14 and the like via the network N. Communication standards such as, for example, Ethernet, FDDI, Wi-Fi, or the like are used at this interface.

The input/output I/F 50 is an interface for the control device 32 to communicate with respective devices that are installed in the unmanned conveying vehicle 12. Further, the control device 32 is connected via the input/output I/F 50 so as to be able to communicate with respective devices that are described hereinafter. Note that these devices may be directly connected to the bus 52.

In detail, the motor drivers 30, external sensors 54, a reader/writer 56, and the display device 38 are connected to the input/output I/F 50. The motor driver 30 outputs control signals to the motor 28 on the basis of command signals inputted from the control device 32, and can control the rotational speed, the rotating direction and the like of the motor 28. Further, in the present exemplary embodiment, the advancing direction of the unmanned conveying vehicle 12 can be changed due to the rotational speeds, the rotating directions and the like of the pair of motors 28 being respectively controlled independently by the control device 32 and the pair of motor drivers 30.

The external sensors 54 are a sensor group that is used in detecting the peripheral environment of the unmanned conveying vehicle 12. The external sensors 54 include a camera that captures images of a predetermined range, and millimeter wave radar that transmits search signals over a predetermined range. The data acquired by the external sensors 54, which is the images captured by the camera, is temporarily stored in the storage 46, and is emitted from the communication I/F 48 and transmitted to the server 14.

The reader/writer 56 is installed in the vehicle body portion 16, and can read electronic information from the RF tag 36 and write electronic information to the RF tag 36. The information relating to the parts that is read from the RF tag 36 is temporarily stored in the storage 46, and is transmitted from the control device 32 to the server 14 in a state of being associated with the ID (IDentification) of the unmanned conveying vehicle 12 that conveys those parts, which ID is stored in the storage 46.

Note that, in the state in which the parts have been taken-out from the case 34, the reader/writer 56 rewrites the electronic information of the RF tag 36 to electronic information that expresses that the unmanned conveying vehicle 12 is not conveying parts. Concretely, the reader/writer 56 rewrites the part numbers to part numbers that express empty load, rewrites the input codes to input codes expressing the places that the parts were conveyed to, rewrites the takt times T to infinite, and rewrites the sizes V of the parts to 0. Note that the reader/writer 56 can sense that the parts have been taken-out from the case 34 on the basis of a signal outputted from an unillustrated load indicator or the like that is provided at the unmanned conveying vehicle 12.

Figure 3:
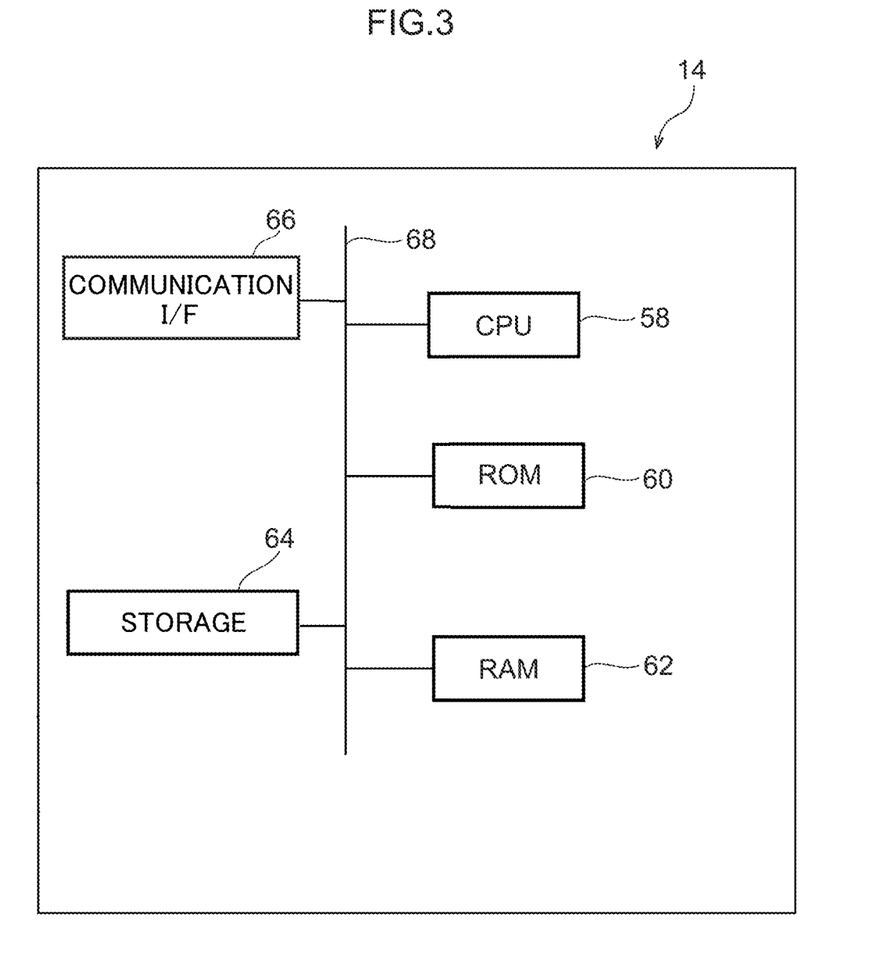
FIG. 3 is a block drawing that illustrates hardware structures of a server that structures a portion of the unmanned conveying system relating to the present exemplary embodiment.

The structure of the server 14 is described next by using FIG. 3. The server 14 is structured to include a CPU 58, a ROM 60, a RAM 62, a storage 64 and a communication I/F 66. The CPU 58, the ROM 60, the RAM 62, the storage 64 and the communication I/F 66 are connected so as to be able to communicate with one another via a bus 68. Note that the CPU 58, the ROM 60, the RAM 62, the storage 64 and the communication I/F 66 have functions that are basically similar to those of the above-described sections that structure the control device 32.

The storage 64 stores three-dimensional map data in which a 3D model, which includes the shapes, the placed locations and the like of pillars 70 (see FIG. 1) that are disposed within the factory 22, and image data of respective places within the factory, are associated with one another.

On the basis of input from an unillustrated input device by an operator, the storage 64 stores data in which the part numbers of parts that are used within the factory 22, and places where these parts are to be input within the factory 22, are associated with one another. Moreover, the storage 64 temporarily stores information relating to the cargo 26 which information is transmitted from the reader/writer 56 via the control device 32, e.g., stores the number of parts that are included in the cargo 26, various information relating to the parts, and the ID of the unmanned conveying vehicle 12 that is conveying the parts.

Further, due to an execution program that is stored in the ROM 60 being read-out and executed by the CPU 58, the server 14 can exhibit various functions as described later.

The functional structures of the control device 32 are described next by using FIG. 4. The control device 32 functions as the aggregate of a communication section 72, a "driving control section 74", an image data acquiring section 76 and an information display portion 78 due to the CPU 40 reading-out an execution program that is stored in the ROM 42 and executing the execution program.

The communication section 72 receives signals that are transmitted from the server 14 via the network N, and acquires various information. Further, the communication section 72 transmits data, which is acquired by the external sensors 54, to the server 14.

On the basis of driving signals from the server 14 that are described later, the driving control section 74 controls the motor drivers 30, and controls the driving amounts of the motors 28 and the like.

The image data acquiring section 76 acquires data such as images and the like from the external sensors 54, and detects the absence/presence of objects at the periphery of the unmanned conveying vehicle 12.

On the basis of information relating to the cargo 26, the information display portion 78 displays, on the display device 38, the part numbers, the input codes, the takt times T and the sizes V of the parts included in the cargo 26.

The functional structures of the server 14 are described next. The server 14 functions as the aggregate of a communication section 80, a map data storing section 82, a cargo information acquiring section 84, a "traveling route setting section 86", a "conveying vehicle position estimating section 88", a driving amount computing section 90, and a "cargo priority order deciding section 92", due to the CPU 58 reading-out an execution program that is stored in the ROM 60 and executing the program.

The communication section 80 receives signals that are transmitted from the control device 32 of the unmanned conveying vehicle 12 via the network N, and acquires various information. Further, the communication section 80 transmits various signals to the control device 32 as described later.

On the basis of various data including the 3D model of the factory 22 that a user inputted, and image data that has been transmitted from the control device 32, and the like, the map data storing section 82 carries out management such that there is a state in which the three-dimensional map data of the factory 22 and the places for inputting the parts that are used within the factory 22, are the most recent.

On the basis of signals inputted from the control device 32 and the data stored in the map data storing section 82, the cargo information acquiring section 84 acquires information relating to the parts that are included in the cargo 26, the places within the factory 22 where these parts are to be input, and the like. Further, the ID of the unmanned conveying vehicle 12 that conveys the parts is acquired for each of the parts respectively.

On the basis of the information acquired by the cargo information acquiring section 84, the three-dimensional data of the factory 22 that is stored in the map data storing section 82, and the like, the traveling route setting section 86 sets the conveying routes of the cargo 26, i.e., the traveling routes of the unmanned conveying vehicles 12. Note that, in the present exemplary embodiment, basically, the traveling route setting section 86 carries out setting such that the unmanned conveying vehicle 12 that is in the midst of conveying the cargo 26 travels on a left-side path 24A, and the unmanned conveying vehicle 12 that has finished conveying the cargo 26 travels on a right-side path 24B.

On the basis of the image data transmitted from the control device 32, the three-dimensional map data of the factory 22 that is stored in the map data storing section 82, and the like, the conveying vehicle position estimating section 88 estimates the positions of the respective unmanned conveying vehicles 12.

On the basis of the traveling routes of the unmanned conveying vehicles 12 that were set at the traveling route setting section 86, and the positions of the unmanned conveying vehicles 12 that were estimated at the conveying vehicle position estimating section 88, the driving amount computing section 90 computes the driving amount of the driving wheels 18 per predetermined time at each of the unmanned conveying vehicles 12. Then, the driving amount computing section 90 transmits driving signals that are based on these driving amounts to the control devices 32 via the communication section 80.

When the conveying vehicle position estimating section 88 detects that the unmanned conveying vehicles 12 are approaching one another, the cargo priority order deciding section 92 decides on the priority order in which the cargo 26 are to be conveyed, on the basis of the various information relating to the parts that were acquired by the cargo information acquiring section 84 and in accordance with conditions of these parts.

More specifically, the cargo priority order deciding section 92 compares the takt time T of a part that is included in the cargo 26 conveyed by one of the unmanned conveying vehicles 12 and a part that is included in the cargo 26 conveyed by another of the unmanned conveying vehicles 12. Then, the cargo priority order deciding section 92 sets the priority order of the part whose takt time T is shorter among these parts to be a higher priority.

Further, in a case in which the difference between the takt times T of the part that is included in the cargo 26 conveyed by one of the unmanned conveying vehicles 12 and the part that is included in the cargo conveyed by the another of the unmanned conveying vehicles 12 falls within a predetermined time, the cargo priority order deciding section 92 decides upon the priority order of the parts while including the condition of the sizes V of the parts in the decision.

In detail, the cargo priority order deciding section 92 compares evaluation indices I of the parts, which are computed by multiplying the inverses of the takt times T and the sizes of V, of a part that is conveyed by one of the unmanned conveying vehicles 12 and a part that is conveyed by the another of the unmanned conveying vehicles 12, and sets the priority order of the part whose evaluation index I is higher to be a higher priority.

Note that, at the cargo 26 whose case 34 is empty, as described above, the electronic information of the RF tag 36 is rewritten by the reader/writer 56, and the takt time T is infinite, and the evaluation index is 0. Therefore, the cargo priority order deciding section 92 sets the priority order in which this cargo 26 is to be conveyed to the lowest priority.

Further, in the present exemplary embodiment, on the basis of the priority order that the cargo priority order deciding section 92 decided upon, the driving control section 74, the traveling route setting section 86, and the driving amount computing section 90 can control the traveling of the unmanned conveying vehicle 12 (a second unmanned conveying vehicle) that conveys the cargo 26 (second cargo) whose priority order is lower, so as to not impede the traveling of the unmanned conveying vehicle 12 (a first unmanned conveying vehicle) that conveys the cargo 26 (first cargo) whose priority order is higher.

Figure 6:
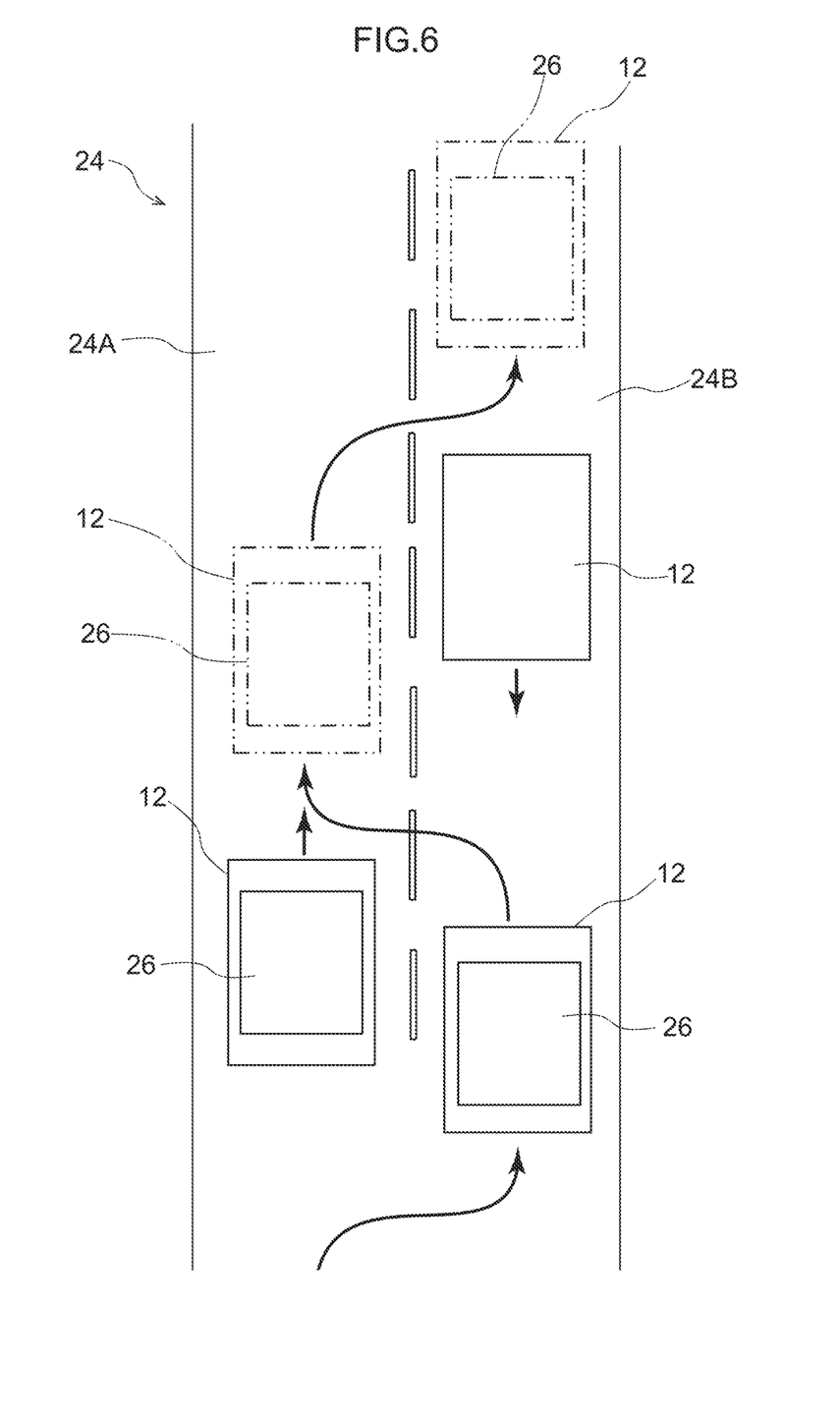
FIG. 6 is a plan view that schematically illustrates a situation of conveying cargo at a time when unmanned conveying vehicles approach one another in the unmanned conveying system relating to the present exemplary embodiment.

In the present exemplary embodiment, for example, as illustrated in FIG. 6, when the unmanned conveying vehicle 12 that conveys the cargo 26 whose priority order is relatively high approaches a predetermined distance from the unmanned conveyed vehicle 12 that conveys the cargo 26 whose priority order is relatively low, the unmanned conveying vehicle 12 conveying the cargo 26 whose priority order is relatively low is stopped temporarily.

Then, as illustrated by the two-dot chain line in FIG. 6, the traveling route of the unmanned conveying vehicle 12, which conveys the cargo 26 whose priority order is relatively high, is reset regardless of whether the left-side path 24A or the right-side path 24B, and the conveying of this cargo 26 is carried out.

Operation and effects of the present exemplary embodiment are described next.

In the present exemplary embodiment, as illustrated in FIG. 1, the plural unmanned conveying vehicles 12 are provided, and cargo is conveyed by these unmanned conveying vehicles 12.

From the standpoint of managing the manufacturing processes in the factory 22 and the like, it is preferable to set the order in which the cargo 26, which are parts and the like, are conveyed in accordance with the priority order of the cargo 26.

Figure 4:
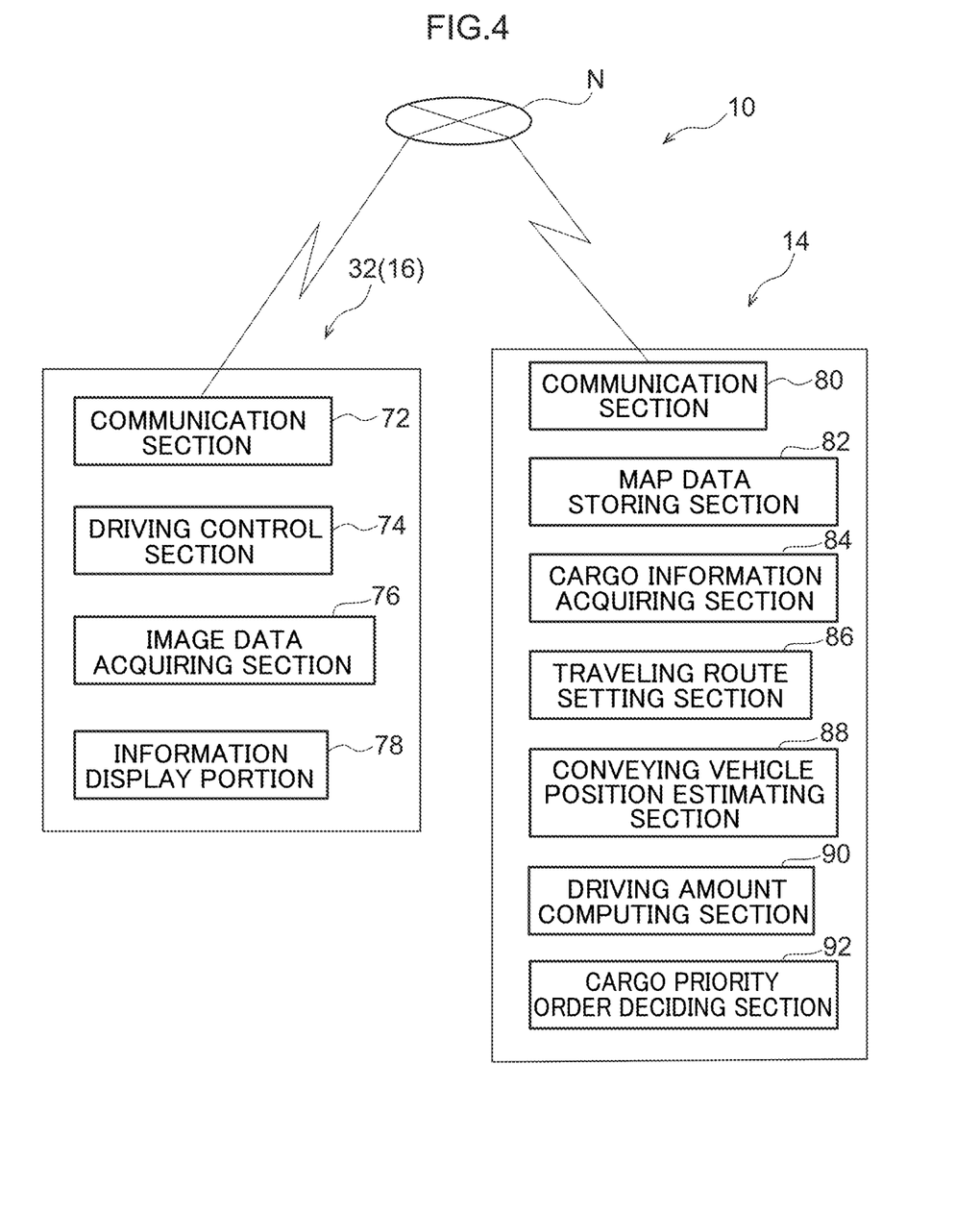
FIG. 4 is a block drawing that illustrates functional structures of the unmanned conveying system relating to the present exemplary embodiment.

Here, in the present exemplary embodiment, as illustrated in FIG. 4, the cargo priority order deciding section 92 and the traveling route setting section 86 are provided. At the cargo priority order deciding section 92, the priority order in which the cargo 26 are conveyed is decided upon in accordance with conditions of the cargo 26. Then, at the traveling route setting section 86, the traveling routes of the unmanned conveying vehicles 12 are set on the basis of the priority order of the cargo 26.

Therefore, for example, it is possible to move the unmanned conveying vehicle 12, which conveys the cargo 26 whose priority order is relatively low, from the traveling route of the unmanned conveying vehicle 12 that conveys the cargo 26 whose priority order is relatively high. Accordingly, in the present exemplary embodiment, conveying of the cargo 26 can be carried out in accordance with the priority order of the cargo 26.

Further, in the present exemplary embodiment, the traveling of the unmanned conveying vehicles 12 is controlled at the driving control section 74, and the positions of the unmanned conveying vehicles 12 are estimated at the conveying vehicle position estimating section 88. Then, when the conveying vehicle position estimating section 88 detects that the unmanned conveying vehicles 12 that are in the midst of conveying the cargo 26 are approaching one another, the traveling route setting section 86 and the driving control section 74 control the traveling of the unmanned conveying vehicles 12 on the basis of the priority order that is decided upon by the cargo priority order deciding section 92.

Figure 7:
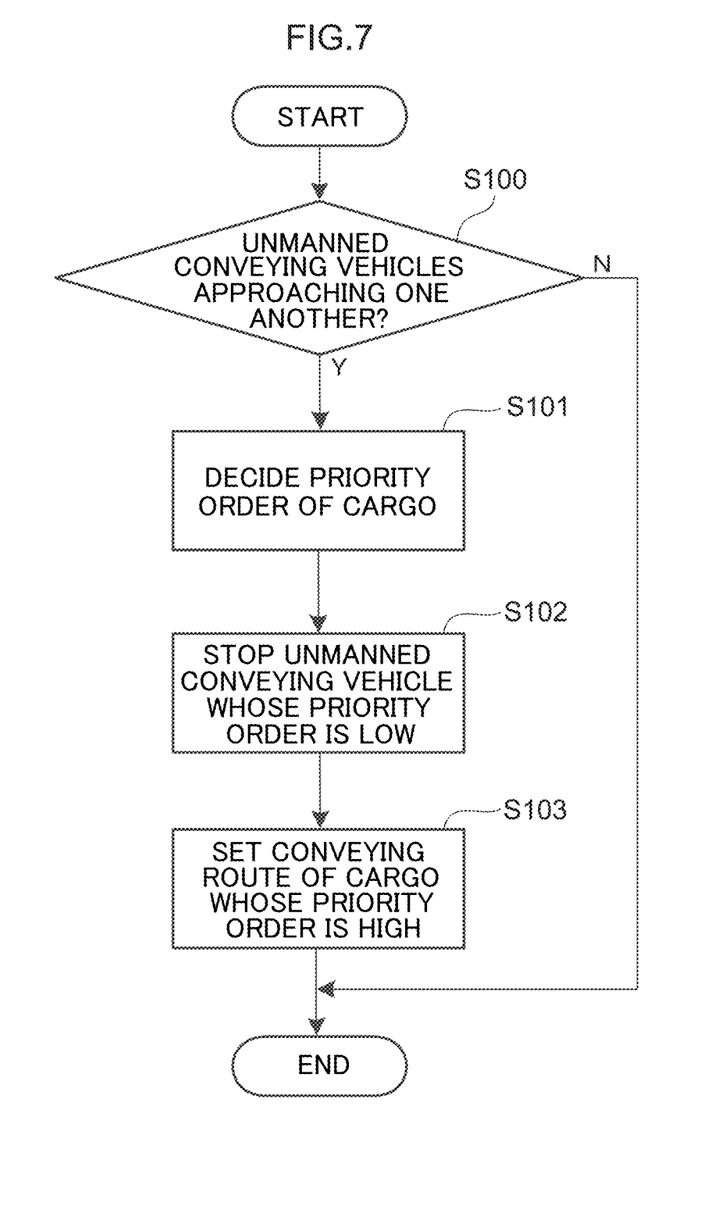
FIG. 7 is a flowchart illustrating the flow of control of the unmanned conveying vehicle by the server in the unmanned conveying system relating to the present exemplary embodiment.

The flow of control of the unmanned conveying vehicles 12 by the server 14 at this time will be described by using mainly the flowchart illustrated in FIG. 7. This control flow is started due to the CPU 58 receiving a predetermined instruction signal.

When this control flow is started, in step S100, on the basis of image data and the like that are transmitted from the control devices 32, the CPU 58 determines whether or not the unmanned conveying vehicles 12 are approaching one another. If it is detected that the unmanned conveying vehicles 12 are approaching one another (step S100: YES), the CPU 58 moves on to step S101. If it is not detected that the unmanned conveying vehicles 12 are approaching one another (step S100: NO), the CPU 58 ends the control flow.

In step S101, the CPU 58 determines the priority order of the cargo 26 at the unmanned conveying vehicles 12 that are approaching one another, and moves on to step S102.

In step S102, the CPU 58 transmits a driving signal to the control device 32 of the unmanned conveying vehicle that is conveying the cargo 26 whose priority order is low, and stops that unmanned conveying vehicle 12.

In step S103, the CPU 58 sets the traveling route of the unmanned conveying vehicle 12 that is conveying the cargo 26 whose priority order is high, and ends the control flow.

Concretely, as illustrated in FIG. 6, when the unmanned conveying vehicle 12 that conveys the cargo 26 whose priority order is high approaches a predetermined distance from the unmanned conveying vehicle 12 that conveys the cargo 26 whose priority order is low, the unmanned conveying vehicle 12 that conveys the cargo 26 whose priority order is low is stopped so as to not impede the traveling of the unmanned conveying vehicle 12 that conveys the cargo 26 whose priority order is high. Then, the traveling route of the unmanned conveying vehicle 12 that conveys the cargo 26 whose priority order is high is reset, and this unmanned conveying vehicle 12 travels along this traveling route. Accordingly, in the present exemplary embodiment, the cargo 26 whose priority order is high may be conveyed smoothly.

Further, in the present exemplary embodiment, the takt time T of a product that is manufactured in a predetermined process by using a part that is included in the cargo 26, is included in the conditions of the cargo 26 that determine the priority order in which the cargo 26 are to be conveyed. The cargo priority order deciding section 92 compares the takt times T of the products in which the parts are to be used, at the unmanned conveying vehicles 12 that are approaching one another, and sets the priority order of the part, which is to be used in the product whose takt time T is shorter, to be high. Therefore, the present exemplary embodiment gives priority to the traveling of the unmanned conveying vehicle 12 that conveys a part that is to be used in a product whose takt time T is short. Accordingly, in the present exemplary embodiment, a part that is to be used in a product whose takt time T is short may be conveyed prioritarily.

In addition, in the present exemplary embodiment, the size V of the part that is included in the cargo 26 is included in the conditions of the cargo 26 that determine the priority order in which the cargo 26 are to be conveyed. The cargo priority order deciding section 92 compares the evaluation indices I of the parts, which are computed by multiplying the inverses of the takt times T of the products in which the parts are to be used and the sizes V of these parts, at the unmanned conveying vehicles 12 that are approaching one another, and sets the priority order of the part whose evaluation index I is higher to be higher. Therefore, in the present exemplary embodiment, of the unmanned conveying vehicles 12 that are approaching one another, the traveling of the unmanned conveying vehicle 12 that conveys the part whose evaluation index I is higher is prioritized. Accordingly, in the present exemplary embodiment, a part that is large and whose takt time T is short can be conveyed prioritarily, and parts racks being occupied by large parts may be suppressed within the factory 22.

In the above-described exemplary embodiment, the priority order in which the cargo 26 are conveyed is determined by the takt times T of the products in which the parts, which are included in the cargo 26, are to be used and the sizes V of the parts, but the present disclosure is not limited to this. For example, the priority order in which the cargo 26 are conveyed may be determined by the conveying places and the input places of the parts, in accordance with the layout of the factory 22 and the like.

Further, in the above-described exemplary embodiment, the traveling route of the unmanned conveying vehicle 12 that conveys the cargo 26 whose priority order is high is ensured due to the unmanned conveying vehicle 12, which conveys the cargo 26 whose priority order is low, being stopped temporarily. However, the present disclosure is not limited to this. For example, in accordance with the layout of the factory 22 or the like, the unmanned conveying vehicle 12 that conveys the cargo 26 whose priority order is low may be made to stand-by temporarily in a safety zone. Or, the unmanned conveying vehicle 12 that conveys the cargo 26 whose priority order is low may be driven in reverse, and the traveling route of the unmanned conveying vehicle 12 that conveys the cargo 26 whose priority order is high may be ensured.

What is claimed is:
1. An unmanned conveying system, comprising:
 a plurality of unmanned conveying vehicles that convey cargo;

a cargo priority order deciding section that decides upon a priority order in which the cargo are to be conveyed, in accordance with conditions of the cargo;

a traveling route setting section that decides upon traveling routes of the plurality of unmanned conveying vehicles on the basis of the priority order;

a driving control section that controls traveling of the plurality of unmanned conveying vehicles; and a conveying vehicle position estimating section that estimates positions of the plurality of unmanned conveying vehicles, wherein:

when the conveying vehicle position estimating section detects that the plurality of unmanned conveying vehicles that are conveying the cargo are approaching one another, the traveling route setting section and the driving control section, on the basis of the priority order, control traveling of a second unmanned conveying vehicle that conveys second cargo whose priority order is lower, so as to not impede traveling of a first unmanned conveying vehicle that conveys first cargo whose priority order is higher, a takt time of a product, which is manufactured in a predetermined step by using a part that serves as the cargo, is included in the conditions, the cargo priority order deciding section compares the takt times of the products in which the parts are to be used, at the plurality of unmanned conveying vehicles that are approaching one another, and sets the part, which is to be used in the product whose takt time is shorter, to have a higher priority order, a size of the part is included in the conditions, and the cargo priority order deciding section compares evaluation indices of the parts, which are computed by multiplying the sizes of, and inverses of the takt times of, the products in which the parts are to be used, at the plurality of unmanned conveying vehicles that are approaching one another, and sets the part, whose evaluation index is higher, to have a higher priority order.

2. An unmanned conveying system, comprising:

a plurality of unmanned conveying vehicles that convey cargo; and a processor connected to the plurality of unmanned conveying vehicles so as to be able to communicate therewith, the processor configured to:

set a priority order in which the cargo are to be conveyed, in accordance with conditions of the cargo, and decide upon traveling routes of the plurality of unmanned conveying vehicles on the basis of the priority order, wherein:

an unmanned conveying vehicle, among the plurality of unmanned conveying vehicles, has a further processor that controls traveling of the unmanned conveying vehicle on the basis of communication from the processor, the processor is configured to:

estimate positions of the plurality of unmanned conveying vehicles, and when, as a result of the estimating, it is detected that the plurality of unmanned conveying vehicles that are in the midst of conveying the cargo are approaching one another, on the basis of the priority order, control traveling of a second unmanned conveying vehicle that conveys second cargo whose priority order is lower, so as to not impede traveling of a first unmanned conveying vehicle that conveys first cargo whose priority order is higher, a takt time of a product, which is manufactured in a predetermined step by using a part that serves as the cargo, is included in the conditions, the processor is configured to compare the takt times of the products in which the parts are to be used, at the plurality of unmanned conveying vehicles that are approaching one another, and set the part, which is to be used in the product whose takt time is shorter, to have a higher priority order, a size of the part is included in the conditions, and the processor is configured to compare evaluation indices of the parts, which are computed by multiplying the sizes of, and inverses of the takt times of, the products in which the parts are to be used, at the plurality of unmanned conveying vehicles that are approaching one another, and set the part, whose evaluation index is higher, to have a higher priority order.

* * * * *